United States Patent
Bersani

[11] 3,907,432
[45] Sept. 23, 1975

[54] ROTATING OPTICAL WEDGE DEVICE

[76] Inventor: Franco Bersani, Via A. da Sangallo, 10, Piacenza, Italy

[22] Filed: Sept. 17, 1973

[21] Appl. No.: 397,912

[30] Foreign Application Priority Data
Sept. 20, 1972 Italy.................................. 29421/72

[52] U.S. Cl. ..................... 356/138; 356/3; 356/253; 350/25
[51] Int. Cl. ............................................ G01b 11/26
[58] Field of Search ........... 356/138, 142, 143, 253, 356/3, 6, 16; 350/204, 25, 26

[56] References Cited
FOREIGN PATENTS OR APPLICATIONS
255,795   1930   Italy..................................... 350/204

*Primary Examiner*—Ronald L. Wibert
*Assistant Examiner*—Paul K. Godwin
*Attorney, Agent, or Firm*—Basile and Weintraub

[57] ABSTRACT

An optical rotating wedge device for the exact measuring of close angles particularly useful to the exact measure of slanting distances as well as for the direct reading on stadia of topographical distances and gradients essentially comprising a topographic telescope mechanically connected with an optical wedge enabled to rotate by any carefully measurable angle, a mechanical gear suitable to operate the wedge rotation and a reading means connected to said mechanical gear and provided with helicoidal graduations of angles which are fuctions of the rotation angle of said optical wedge.

10 Claims, 7 Drawing Figures

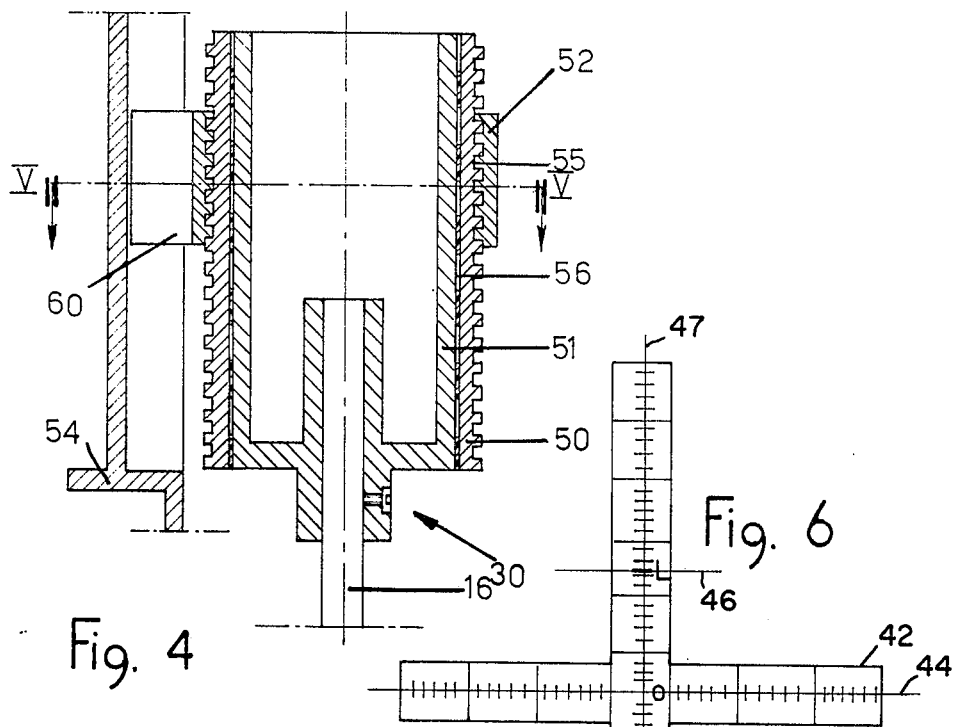
Fig. 4
Fig. 6
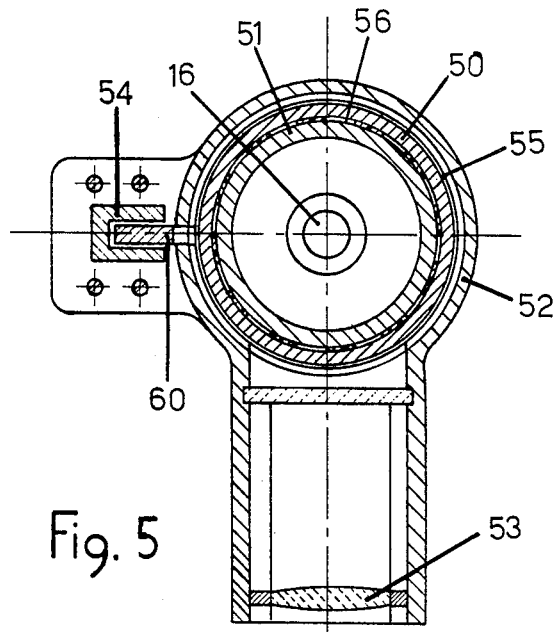
Fig. 5
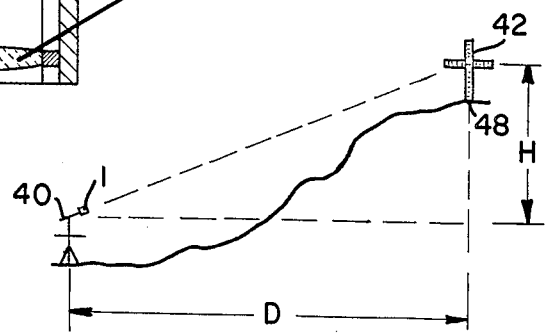
Fig. 7

ROTATING OPTICAL WEDGE DEVICE

BACKGROUND OF THE INVENTION

The present invention relates to a rotating optic wedge device for the exact measuring of close angles, particularly useful for the exact measure of slanting distances as well as for the direct reading on stadia of topographical distances and gradients.

It is known that for the measure of topographic distances, when it is desirable to obtain measurements with an accuracy characterized by confidence ranges of some centimeters, it is necessary to use very delicate and expensive instruments, for instance theodolites with horizontal invar target rod exclusively manufactured by high precision mechanical and optical industries.

There are also known from the prior art autoreduction units used for tachymetric survey. These units, even if based on different constructive methods, present the drawbacks of high price and assembling difficulty.

SUMMARY OF THE INVENTION

The present invention provides a device which, when applied to a normal tachymeter, allows the direct reading on stadia of topographic distances and gradients, with the same accuracy obtainable by means of the most expensive instruments known from the prior art, while still being of flexible use, simple in manufacture and not very costly with respect to the units of equally high accuracy.

Another object of this invention is to allow the exact measuring of slanting distances.

The diastimeter according to this invention is essentially formed by a topographic telescope and an optical prism wedge mechanically connected to said telescope and able to rotate about the optical axis by any carefully measurable angle, being further provided mechanical gears suitable to operate the rotation of said wedge and graduations fitted to allow the reading of angles which are function of this rotation.

It is known that an optical prism causes the optical paths passing through it to deviate according to the refraction index of the glass of which the prism is made and the angle comprised between its two faces.

A Richard prism, for example, causes a deviation of about $34'23''$ i.e. an angle whose cotangent is 100.

It is clear that by rotating a mechanically connected prism in front to the objective lens of a telescope, an observer will see the collimation axis identified by the telescope grating to shift.

Precisely, if we cause the optical prism connected to the telescope to rotate by 360°, the center of the telescope grating will describe a circumference and the collimation axis identified by the grating and incident on the external slanting prism face will describe a cone having a flare angle $\delta$ equal to the angle of deviation of the prism, and the apex at the point in which the collimation axis intersects the external superficies of said optical prism or wedge.

The most important cause of error in measuring distances by a tachymeter with constant parallactic angle is due to the uncertainty with which it is possible to read the stadia intervals, do to the fact that, generally, the interception of the tachymeter grating cobweb does not occur on a target of the stadia. The diastemeter according to the present invention is based on the principle of making variable the parallactic angle $\omega = \delta \cos \rho$ ($\rho$ rotation angle of prism) so as to make possible the collimation of the grating cobweb on the targets of a stadia, making it possible a far greater accurracy. Besides, the possibility of varying the parallactic angle of the unit allows the direct reading on cross stadia of topographic distances and gradients.

BRIEF DESCRIPTION OF THE DRAWINGS

The present invention will be now described in greater detail, with reference, by way of example only, to some of its preferred embodiments illustrated in the attached drawings.

FIG. 4 shows a vertical section, in an enlarged scale of a preferred embodiment of a mechanical gear suited to allow the optical wedge to rotate by predetermined angles;

FIG. 5 is a sectional view along line V—V of FIG. 4

FIG. 6 shows a cross stadia used in connection with the device of this invention and FIG. 7 is a descriptive drawing showing the overall invention in a working environment.

DESCRIPTION OF THE PREFERRED EMBODIMENT

Figure 1:
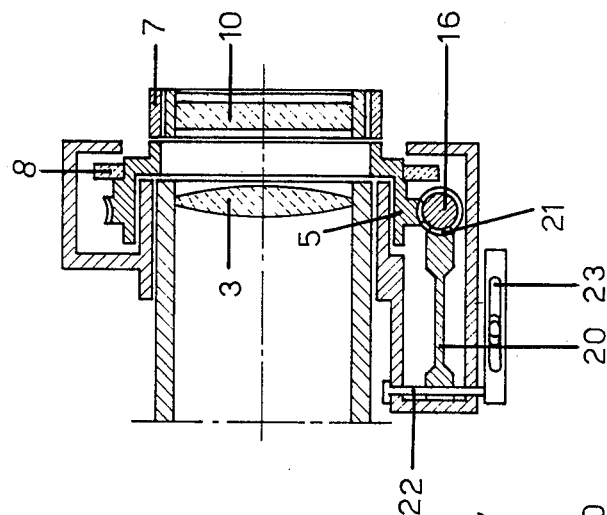
FIG. 1 is a longitudinal sectional elevation turning optical wedge of the device according to this invention.

With reference to FIG. 1, which shows the vertical longitudinal section of a preferred embodiment of the present invention, we note a body 2 and a telescope objective lens 3 of the device generally identified by reference 1.

A ring nut 4 is secured to the body 2, for instance, by a setscrew, while an annular member 5 is fit to rotate about the telescope axis.

The reading of rotation angles of the annular member 5 can be made on a graduated rim 8 provided on the peripheric part of said member 5.

Figure 3:
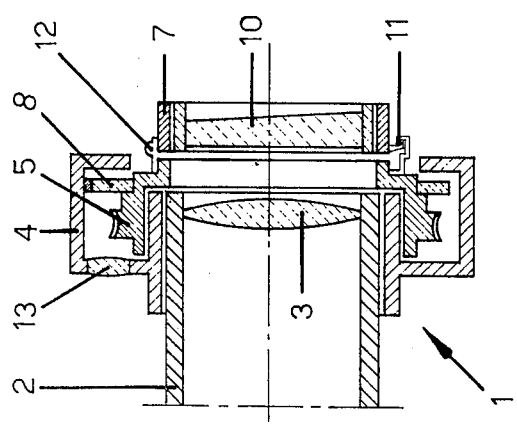
FIG. 3 is a lateral elevation with partially removed parts.

FIG. 1 together with FIG. 3 shows moreover a tube 7 fastened to the annular member 5 by a locking spring 11 and a hinge 12.

Tube 7 contains an optical wedge 10 (with a deviation-angle $\delta$ equivalent for instance to $34'23''$) and can be disjoined or securely fastened to the annular member 5 by means of hinge 12 and spring 11.

Besides, pawls can be present which are suited to lock the wedge 10 in such positions to cause, respectively, the vertical and horizontal deviations of the collimation axis.

The reading on the graduated rim 8 of the rotation angle of annular member 5, and hence of tube 7 and wedge 10 all reciprocally integral can be made easier by using a microscope 13 provided on the ring nut 4.

Figure 2:
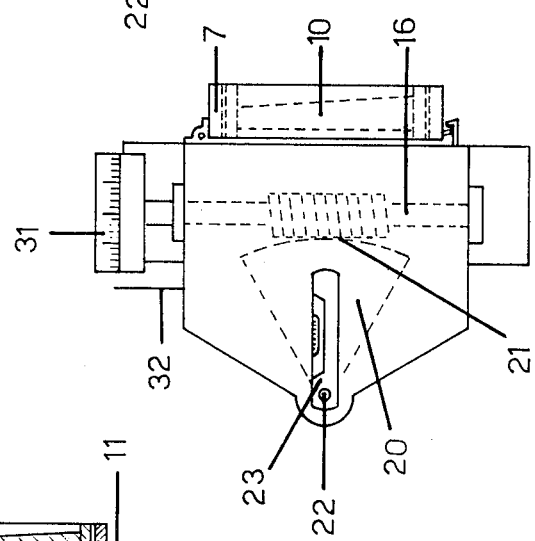
FIG. 2 is a longitudinal section taken at 90° with reference to FIG. 1.

The microscope 13 as shown in FIGS. 1 and 2 allows, indeed, a very accurate reading of the graduations of rim 8.

FIGS. 2 and 3 put particularly in evidence the mechanical gear suited to allow the rotation of optical wedge 10 by accurately controllable angles.

Said mechanical gear is formed by a worm 16 whose helical screw thread engages in a corresponding thread of member 5 and in the helical thread 21 of a circular sector member 20 integral through a shank 22, with a toric level 23. Thus to a rotation of worm 16 corresponds the correlated rotations of optical wedge 10 and of level 23 which, in a base position, is parallel to the collimation axis of the diastimeter.

The above described mechanical gear permits the direct reading of short distances and gradients by using a cross stadia 42 such as that of FIG. 6 disposed on a vertical plane perpendicular to the sight. FIG. 6 also illustrates an overlay of the cobwebs formed on the lens 3.

As a matter of fact, if we collimate, with included wedge and vertical deviation to the lower cobweb 44 of the telescope grating the O of the stadia 42, held to a ground height equal to that of the unit, we shall read on the upper horizontal cobweb 46 of the grating a stadia interval, whose value multiplied by K (constant of the unit) gives the slanting distance.

If we turn the wedge by an angle $\rho$ until we center the toric level ($\rho=\alpha$; $\alpha$=elevation angle of the unit) the horizontal upper cobweb of the grating will intercept on the vertical arm of the stadia a segment proportional to the topographic distance, while the vertical cobweb of the grating will intercept, on the horizontal arm of the stadia, a segment proportional to the gradient.

According to the embodiment shown in FIG. 1, 2 and 3 there is also provided a graduate knob 31 for the operation of worm 16.

Knob 31 allows, through a suitable pointer 32, the measuring of the rotation angle of wedge 10. FIGS. 4 and 5 show a mechanical gear, generally identified by reference number 30, which, according to a preferred embodiment can be assembled on the worm axis 16 instead of the control knob 31 (FIG. 3) which in turn can be fastened to the other end of the worm.

With reference to such figures, we note a protective cylinder 50, a hollow cylinder 51, a ring 52 suited to support a lens 53, and a guide 54.

In the assembly state the cylinder 51 is integral with worm 16, guide 54 is integral with diastimer body 1 and ring 52, controlled by element 54 through a bar 60 integral with it, has an internal thread 55 having the same pitch of the thread made on the outer surface of the protective cylinder 50.

Between the outer surface of the hollow cylinder 51 and that of the internal protective cylinder made of transparent material for instance of Plexiglas; ("Plexiglas" is a trade mark of an acrylic resin) is inserted a diagram 56 on which several graduation are engraved or printed.

According to a preferred embodiment of the present invention, the graduations of diagram 56 are three, one of which relates to the elevation angle $\alpha$ corresponding to rotation angle $\rho$ of the optical prism 10, and the other two graduations to angles $\rho_d$ and $\rho_\Delta$ given as functions of $\alpha$ and necessary to make possible the direct measuring by vertical stadia of topographic distances and gradients, as will be explained better further on.

On the ground of what has been said, it is easy to understand the operation and the applications of diastimeter according to the present invention.

Precisely, if it is necessary to carry out an accurate measuring between points different in height, by putting the rotary wedge gear, i.e. the diastimeter and a stadia in correspondence with such points, we shall collimate the lower grating cobweb to the zero of the stadia kept perpendicular to the sight, and we shall rotate the wedge 10 firstly in such a position that it will give a vertical deviation of sight, up to the collimation with upper grating cobweb of the first met target.

At this point the value of the rotation angle can be read on the graduated rim 8. Taken as $S°$ the surveyed stadia range and $S'$ the range read without making the rotation of the angle $\rho$, it will be:

$$S' = S° \sec \rho$$

The slanting distance is then equal to $d'=KS°. \sec \rho$ ($K$ = instrumental constant). The advantage enjoyed by using the diastimeter according to the present invention in this simple application is due to the fact that the reading of range $S°$ turns out from two collimations on two targets and not from two readings on the stadia.

The error, even of some primes, in measuring angle $\rho$ is of very little importance and is a minimum for small values of $\rho$.

In fact, as the parallactic angle $\omega$ is equal to $\delta \cos \rho$, the measure error on the angle $\omega$ results from the reading error on the angle $\rho$ and then it is proportional to $\sin \rho$ which tends to zero as $\rho$ tends to zero.

The above measure can be also carried out on horizontal stadia simply rotating the wedge 10 as to obtain a horizontal deviation of sight.

One of the most important applications of diastimeter according to the present invention, concerns the possibility to carry out the direct reading on a cross stadia of topographical distances and gradients.

We set the wedge 10 in such a manner as to obtain a vertical deviation of the collimation axis and lift up the tachymeter 40 up to the collimation of the center target 0 with the lower grating cobweb 44. The upper grating cobweb 46 of the diastimeter 1 will intercept on the vertical arm of the cross stadia a point L (as shown in FIG. 6). Taken as $S''$ the segment OL, we have:

$$(*) \; d = \frac{S''}{\tang (\delta+\alpha) - \tang\alpha}$$

wherein $\delta = 1/K$; $\alpha$ = elevation angle, and $\alpha$ topographical distance.

Taken as $So$ the reading that should have been made at $\alpha = 0$ it is easy to find the following approximate formula from (*):

$$S'' = \frac{So}{\cos^2\alpha}$$

On the other hand the intersection point between the collimation axis of the diastimeter 1 and the vertical plane of the stadia, for a complete rotation of the wedge 10, will describe an elliptical section whose two axes are the following: $b = So/\cos^2\alpha$ and $a = So/\cos\alpha$.

The implicit functions of this elliptical section are:

1) $x = \frac{a}{b} \sqrt{b^2 - y^2}$ and 2) $y = \frac{b}{a} \sqrt{a^2 - x^2}$.

By substituting $y = So$, the 1) becomes $$x = \frac{a}{b} \sqrt{b^2 - So^2}$$

and the angle by which the wedge has to be turned, in order to have $So$ as ordinate of the intersection point, is:

$$3)\ \rho d = \tan^{-1}(tg\alpha \sqrt{1+\cos^2\alpha})_{\rho_\Delta}$$

To obtain the value of the angle $\rho_\Delta$ by which the optical wedge 10 has to be turned in order to read the gradient on the stadia, we give $x = So\ \tan\alpha$.

In the same way, as for 3) we obtain:

$$4)\ \rho_\Delta = \tan^{-1} \sin\alpha.$$

From 3) and 4) we note that the angles $\rho_d$ and $\rho_\Delta$ are functions of the elevation angle $\alpha$. Therefore, if, in addition to $\alpha$, the helicoidal diagram 56 represents the values of the angles $\rho_d$ and $\rho_\Delta$, the rotating optical wedge device of the invention can be used, with the aid of a simple cross stadia, for the direct reading of topographical distances and gradients.

Actually, after the collimation of the lower cobweb with the center target 0 of the stadia has been met, and after the level 23 has been centered by rotating the knob 31, it is possible to read the value of $\alpha$ on the diagram 56, through the lens 53 only enabled to the traslation by means of the guide 54.

Then, known the value of $\alpha$, the control knob 31 is turned until the correspondent value of the angle $\rho d$ is read. In fact $\rho d$ is the angle by which the optical wedge has to be turned in order that the upper horizontal cobweb of the grating may intercept a segment $So$ on the vertical arm of the cross stadia. To read, on the horizontal arm of the cross stadia, the segment $So\ \tan\alpha$ which is proportional to the gradient we can use the same method.

The errors on the gradient measure obtained through this method are mainly due to the reading approximation ($\pm$ 1mm) on the stadia. If $K = 100$ we shall have errors of $\pm$ 10 cm.

If the gradient errors are to be limited to 5 or 2 cm it is necessary to have smaller values of the constant $K$ namely $K=50$ or $K=20$, respectively. To this aim the helicoidal diagram 56, according to a preferred embodiment of the invention, provides the values of the following functions, too:

$$\rho_\Delta{}^{50} = \frac{2\sin\alpha\cos\alpha}{\sqrt{1-4\sin^2\alpha}}\ ;\ \rho_\Delta{}^{20} = \frac{5\sin\alpha\cos\alpha}{\sqrt{1-25\sin^2\alpha}}$$

In summary, the present invention comprises a tachymeter 40, the objective lens 3 of which mounts the inventive device 1. The tachymeter 40 is utilized to view a stadia 42 mounted at some elevated point 48 (FIG. 7) for purposes of determining both the horizontal distance "D" and the vertical height "H". FIG. 6 schematically represents the visual view through the tachymeter 10 when the device 1 is in position and the device has its various elements set at zero. The cobwebs are disposed on the objective lens 3 and as aforementioned, comprises the upper cobweb 46, the lower cobweb 44 and a vertical cobweb 47. FIG. 6 is a view wherein the observer is viewing the stadia 42 and the lower cobweb 44 has been collimated with the zero grating on the stadia 42. The vertical cobweb 47 is collimated with the vertical portion of the stadia 42. To achieve this, the tachymeter 40 is rotated at some inclination or angle with respect to the horizontal. Upon collimating of the cobwebs 44 and 47 of the tachymeter 40 with the vertical and horizontal grating of the stadia 42, the wedge 10 of the device 1 is rotated an angle $\alpha$ of a magnitude which is such as to center the toric level gage 23 carried by the device. At this point, that is, after the wedge 10 has been rotated intitially, the elevation may be read of the cross arm of the stadia 42 as the vertical cobweb 47 will intercept the horizontal arm of the stadia 42. A further rotation of the wedge 10 to an angle wherein $fd$ equals $\alpha$, on the lower scale of the cylinder the horizontal distance can be read on the vertical stadia by means of the interception of the upper cobweb 46 with the vertical portion of the stadia 42. The horizontal distance is represented by the distance between the zero portion of the stadia 42 and the aforementioned interception between the vertical arm and horizontal cobweb 46.

The foregoing is considered as illustrative only of the principles of the invention. Further since numerous modifications and changes will ready occur to those skilled in the art, it is not desired to limit the invention to the exact construction and operation shown and described, and accordingly all suitable modifications and equivalents may be resorted to, falling within the scope of the invention.

What I claim is:

1. A device for the exact measuring of close angles, essentially comprising an optical wedge and a topographical telescope, wherein said optical wedge is mechanically connected to said telescope and able to rotate about the optical axis thereof by any carefully measurable angle, being further provided a mechanical gear connected to the wedge and suitable to operate the rotation of said wedge and a reading means connected with said mechanical gear and provided with helical graduations relating to angles which are functions of the wedge rotation angle.

2. A device for the exact measuring of close angles according to claim 1, wherein said wedge is secured to the internal part of a tubular element coaxial to said telescope and connected, by locking means to an annular element which engages in a ring nut secured to the telescope.

3. A device according to claim 2, wherein said annular member, on its peripherical part, is provided with a graduated rim.

4. A device according to claim 3, wherein a microscope, or other similar reading means, is provided on said ring nut near the graduated rim.

5. A device according to claim 3, wherein said mechanical gear suitable to operate the rotation of said optical wedge is formed by a worm provided with helical screw thread which engages in a corresponding helical thread of said annular member.

6. A device according to claim 5, wherein said worm further engages in an helical thread of a circular sector member integral through a shank with a toric level which, in a base position, is parallel to the collimation axis of said telescope.

7. A device according to claim 5, wherein said angle reading means is formed by a hollow cylinder integral with said worm and having on its surface a plurality of helical angle graduations, one of these fitted graduations representing the values of rotation angle $\rho$ of said optical wedge.

8. A device according to claim 7, wherein said helical angle graduations are three, one of which relating to the rotation angle $\rho$ of the wedge and the other two to angles $\rho_d$ and $\rho_\Delta$ whose values are functions of the said rotation angle $\rho$.

9. A device according to claim 8, wherein said helical graduations of said angles $\rho_d$ and $\rho_\Delta$ are those of the functions $$\rho_d = \tan^{-1}(\tan \rho_\Delta \sqrt{1 + \cos^2\rho} \text{ and } \rho_\Delta = \tan^{-1} \sin \rho$$

10. A device according to claim 7, wherein said cylinder is provided with an external protective cylinder made of transparent material having a helicoidal thread and is connected through a screw gear to a reading lens translated parallel to the generating lines of said hollow cylinder, whereby the worm rotation results in the cylinder rotation and in the lens traslation.

* * * * *